D. L. WINSOR.
Car-Track Clearer.
No. 66,926.　　　　　　　　　　　　　　　　Patented July 16, 1867.
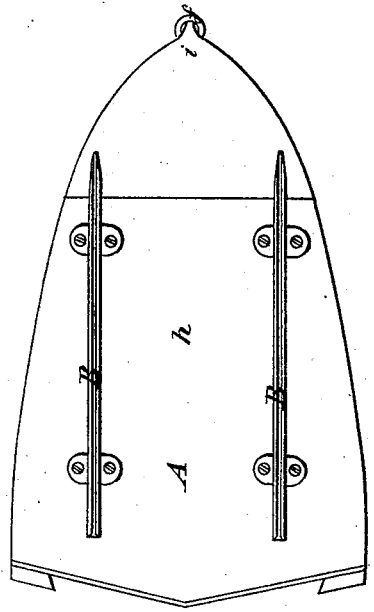
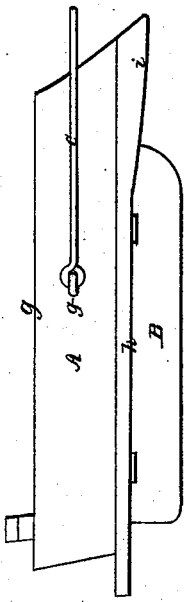
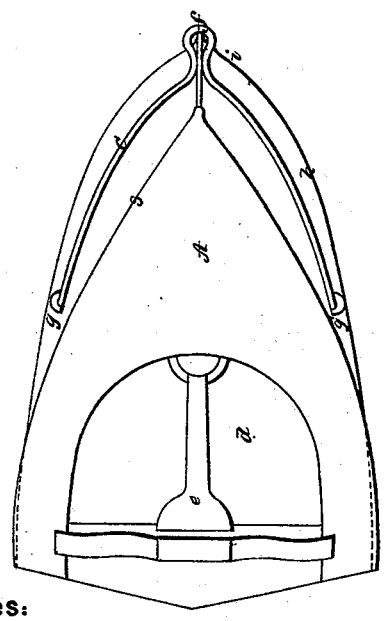
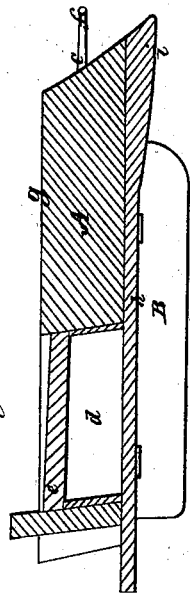
Witnesses:
Inventor:
Daniel L. Winsor.
by his attorney

United States Patent Office.

DANIEL L. WINSOR, OF CAMBRIDGE, MASSACHUSETTS.

Letters Patent No. 66,926, dated July 16, 1867.

IMPROVED SNOW-PLOUGH.

*The Schedule referred to in these Letters Patent and making part of the same.*

TO ALL PERSONS TO WHOM THESE PRESENTS SHALL COME:

Be it known that I, DANIEL L. WINSOR, of Cambridge, in the county of Middlesex, and State of Massachusetts, have invented an improved Snow-Plough; and I do hereby declare the same to be fully described in the following specification, and represented in the accompanying drawings, of which—

Figure 1 is a top view.
Figure 2 a bottom view.
Figure 3 a longitudinal section, and
Figure 4 a side elevation of it.

In such drawings, A denotes the body of the plough, it being formed like the bow of a ship inverted. The main part $h$ of the bottom of the said body is a flat plane. The top surface $g$ of the body is also flat, and parallel to the bottom part $h$. The said bottom surface $h$ has applied or fastened to it two gauges or cutting runners B B, they being arranged parallel to each other, lengthwise of the body, and having their front edges sharp and curved in manner as repesented in the drawings. In front of these gauge-runners the nose of the plough inclines a little so as to bring the bottom surface $i$ of such nose at an obtuse angle with the rest $h$ of the bottom surface of the body. The object of this is to prevent the bottom surface of the body from running in contact with the snow while the plough is at work. The runners pass into the snow, and down or about down to the surface of the ground, and serve not only to support the plough, but to gauge the depth of snow to be left on the ground under the path of the plough. Within the rear part of the body of the plough is a cavity or space, $d$, across which, and lengthwise of the plough, a seat, $e$, is arranged, such seat being to support a person while the plough may be in use. The seat is also advantageous in other respects. A forked bail, C, provided with an eye, $f$, spans the plough at its front, and is connected to it by staples $g'\ g'$, going through eyes of the bail. Instead of this bail, a pole or tongue like that of a cart may be extended from the rear part of the plough, and be provided at its rear end with a cross-head or bar, to which whiffle-trees may be affixed, the same being so as to apply a pair of horses or other animals in rear of the plough, and on opposite side of the tongue, and with their heads toward the nose of the plough. Instead of such tongue, a pair of shafts may be applied to the plough, they being made so as to enable the harness of a horse to be properly connected with them when the animal is placed between them with his head toward the nose of the plough. For most ordinary purposes, however, the bail will suffice, a horse being attached thereto.

A snow-plough of this description has been employed with great effect during the past winter in cleaning the paths and roads of Mount Auburn Cemetery, at Cambridge, in the State of Massachusetts. With the aid of one horse, at a smart walk, a man with such a plough has been able to readily clear the snow from any roadway, so as to make through it a path for carriages. It is calculated that the use of this plough will save hundreds of dollars per year to the association over the modes heretofore adopted by them for the cleaning of snow from the roads and paths of the cemetery.

What I claim as my invention is the combination of the gauge-runners B B with the plough body, provided with the cutting and ploughing nose, as specified.

I also claim the arrangement of the bottom of the nose of the plough body with respect to the rest of the bottom surface of the body, and with the two guide-runners, in manner substantially as specified.

I also claim the arrangement of the cavity $d$ and the seat $e$ within the body of the plough as explained.

DANIEL L. WINSOR.

Witnesses:
R. H. EDDY,
SAMUEL N. PIPER.